United States Patent
Li et al.

(10) Patent No.: US 11,722,339 B2
(45) Date of Patent: Aug. 8, 2023

(54) PILOT INFORMATION SYSTEM SENDING METHOD, CHANNEL ESTIMATION METHOD, AND COMMUNICATIONS DEVICE

(71) Applicant: VIVO MOBILE COMMUNICATION CO., LTD., Guangdong (CN)

(72) Inventors: Jianjun Li, Guangdong (CN); Yang Song, Guangdong (CN); Fei Qin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/985,956

(22) Filed: Nov. 14, 2022

(65) Prior Publication Data

US 2023/0073228 A1 Mar. 9, 2023

Related U.S. Application Data

(63) Continuation of application No. PCT/CN2021/093013, filed on May 11, 2021.

(30) Foreign Application Priority Data

May 15, 2020 (CN) .......................... 202010414538.2

(51) Int. Cl.
*H04L 25/02* (2006.01)
*H04L 27/26* (2006.01)

(52) U.S. Cl.
CPC .... *H04L 25/0202* (2013.01); *H04L 27/26025* (2021.01)

(58) Field of Classification Search
CPC ............ H04L 25/0254; H04L 27/2634; H04L 25/0202; H04L 25/0224; H04L 27/261;
(Continued)

(56) References Cited

U.S. PATENT DOCUMENTS 8,942,321 B2* 1/2015 Shental .............. H04L 25/0248
375/346
2011/0286558 A1* 11/2011 Abrishamkar ...... H04L 25/0234
375/346
(Continued)

FOREIGN PATENT DOCUMENTS

CN 102571666 A 7/2012
CN 103873111 A 6/2014
(Continued)

OTHER PUBLICATIONS

First Office Action for Chinese Application No. 202010414538.2, dated Mar. 29, 2022, 6 Pages.
(Continued)

*Primary Examiner* — Khanh C Tran
(74) *Attorney, Agent, or Firm* — Brooks Kushman P.C.

(57) ABSTRACT

A pilot information symbol sending method, a channel estimation method, and a communications device. The method includes: determining, based on a discrete Fourier transform DFT matrix and a sensing matrix, a pilot information symbol corresponding to each antenna on each pilot resource; and sending a corresponding pilot information symbol on each of the pilot resources for each of the antennas; where the sensing matrix is determined through training of channel information.

20 Claims, 6 Drawing Sheets

(58) Field of Classification Search
CPC ............. H04L 7/26025; H04L 27/2636; H04L 27/2613; H04L 27/26134
See application file for complete search history.

(56) References Cited

U.S. PATENT DOCUMENTS

2014/0307675 A1　10/2014　Xu et al.
2022/0271805 A1*　8/2022　Gao .................... H04B 7/0456

FOREIGN PATENT DOCUMENTS

| CN | 105978674 A | 9/2016 |
|---|---|---|
| CN | 108259397 A | 7/2018 |
| CN | 108322409 A | 7/2018 |
| CN | 109450830 A | 3/2019 |
| CN | 109743268 A | 5/2019 |
| CN | 110365612 A | 10/2019 |
| KR | 20200005807 A | 1/2020 |
| WO | 2020034394 A1 | 2/2020 |

OTHER PUBLICATIONS

International Search Report and Written Opinion for Application No. PCT/CN2021/093013, dated Aug. 20, 2021, 8 Pages.

* cited by examiner

PILOT INFORMATION SYSTEM SENDING METHOD, CHANNEL ESTIMATION METHOD, AND COMMUNICATIONS DEVICE

CROSS-REFERENCE TO RELATED APPLICATIONS

This application is a continuation of PCT International Application No. PCT/CN2021/093013 filed on May 11, 2021, which claims priority to Chinese Patent Application No. 202010414538.2, filed on May 15, 2020, which are incorporated herein by reference in their entireties.

TECHNICAL FIELD

This application relates to the field of communications technologies, and in particular, to a pilot information symbol sending method, a channel estimation method, and a communications device.

BACKGROUND

The goal of 5G is to achieve great performance improvement in terms of transmission rate, user access density, and low latency. The massive multiple-input multiple-output (MIMO) system has become one of the key technologies of 5G mobile communications due to its advantages of high spectral efficiency and high energy efficiency. The 5G network uses the massive MIMO technology to form a large-scale antenna array, to implement simultaneous transmission or reception of signals to or from a larger quantity of users, thereby increasing channel capacity and data load of the mobile network by tens of times or more and also implementing sharp decrease in interference between multiple users. The massive MIMO technology has continuously attracted great attention of researchers since being proposed due to its huge potentials in terms of capacity and performance.

However, in the massive MIMO system, with rapid increase in the antenna scale, pilot overhead and channel state information feedback overhead have become one of the key bottlenecks restricting large-scale commercial use of the massive MIMO technology. In 5G communications networks based on massive MIMO, pilot overhead and channel feedback overhead generated by the massive antenna array that is formed by hundreds of antennas and supported by the 5G base station, as well as complexity of channel estimation, all have an increase of one order of magnitude as compared to those of previous MIMO networks. Therefore, how channel estimation for the massive MIMO communications network is implemented is a problem to be urgently resolved at present.

SUMMARY

Embodiments of this application provide a pilot information symbol sending method, a channel estimation method, and a communications device, so as to resolve the problem of channel estimation in a massive MIMO communications network.

According to a first aspect, an embodiment of this application provides a pilot information symbol sending method, applied to a transmit end and including:
determining, based on a discrete Fourier transform (DFT) matrix and a sensing matrix, a pilot information symbol corresponding to each antenna on each pilot resource; and
sending a corresponding pilot information symbol on each of the pilot resources for each of the antennas; where
the sensing matrix is determined through training of channel information.

According to a second aspect, an embodiment of this application provides a channel estimation method, applied to a receive end and including:
receiving a pilot signal on each pilot resource, where the pilot signal includes a pilot information symbol correspondingly sent on the pilot resource by each antenna of a transmit end; and
performing channel estimation based on a learned approximate message passing (LAMP) network and the pilot information symbols; where
the pilot information symbol is determined based on a discrete Fourier transform DFT matrix and a sensing matrix, the sensing matrix is determined through training of channel information, a LAMP parameter used for channel estimation by the LAMP network is obtained through training on a neural network that is expanded during an iterative solution process based on the sensing matrix and an AMP algorithm.

According to a third aspect, an embodiment of this application provides a communications device, and the communications device is a transmit end of a pilot information symbol, including:
a first determining module, configured to determine, based on a discrete Fourier transform DFT matrix and a sensing matrix, a pilot information symbol corresponding to each antenna on each pilot resource; and
a sending module, configured to send a corresponding pilot information symbol on each of the pilot resources for each of the antennas; where
the sensing matrix is determined through training of channel information.

According to a fourth aspect, an embodiment of this application provides a communications device, and the communications device is a receive end of a pilot information symbol, including:
a receiving module, configured to receive a pilot signal on each pilot resource, where the pilot signal includes a pilot information symbol correspondingly sent on the pilot resource by each antenna of a transmit end; and
a processing module, configured to perform channel estimation based on a learned approximate message passing LAMP network and the pilot information symbols; where
the pilot information symbol is determined based on a discrete Fourier transform DFT matrix and a sensing matrix, the sensing matrix is determined through training of channel information, a LAMP parameter used for channel estimation by the LAMP network is obtained through training on a neural network that is expanded during an iterative solution process based on the sensing matrix and an AMP algorithm.

According to a fifth aspect, an embodiment of this application provides a communications device, including a memory, a processor, and a program or an instruction stored in the memory and capable of running on the processor, and when the program or the instruction is executed by the processor, the steps of the pilot information symbol sending method are implemented, or when the program or the instruction is executed by the processor, the steps of the channel estimation method are implemented.

According to a sixth aspect, an embodiment of this application provides a computer-readable storage medium, where a program or an instruction is stored on the readable storage medium, and when the program or instruction is executed by a processor, the steps of the pilot information symbol sending method are implemented, or when the program or the instruction is executed by a processor, the steps of the channel estimation method are implemented.

According to a seventh aspect, an embodiment of this application provides a chip, where the chip includes a processor and a communications interface, the communications interface is coupled to the processor, and the processor is configured to run a program or an instruction to implement the method according to the first aspect.

In the embodiments of this application, the pilot information symbol corresponding to each antenna on each pilot resource is determined based on the DFT matrix and the sensing matrix; the corresponding pilot information symbol on each of the pilot resources is sent for each of the antennas, where the sensing matrix is determined through training of channel information. In this way, a small quantity of non-orthogonal pilots can be used for reduction of pilot overheads, so that the number of pilots is far less than the number of antennas, and the receive end can perform channel estimation based on the pilot information symbols, which resolves the problem of channel estimation in the massive MIMO communications network. In addition, because the pilot information symbol is determined by using the sensing matrix, it can be ensured that the determined pilot information symbol is an optimal linear mapping adapted to a current channel, thereby improving performance of channel estimation.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

The following clearly and describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this application, the terms "an example" or "for example" are used to represent an example, an illustration, or a description. Any embodiment or design scheme described as "an example" or "for example" in the embodiments of this application should not be construed as being more preferred or advantageous than other embodiments or design schemes. To be precise, the words such as "an example" or "for example" are intended to present a related concept in a specific manner.

The following describes the embodiments of this application with reference to the accompanying drawings. A pilot information symbol sending method, a channel estimation method, and a communications device provided in the embodiments of this application can be applied to a wireless communications system. The wireless communications system may be a 5G system, an evolved long term evolution (eLTE) system, or a later evolved communications system.

Figure 1:
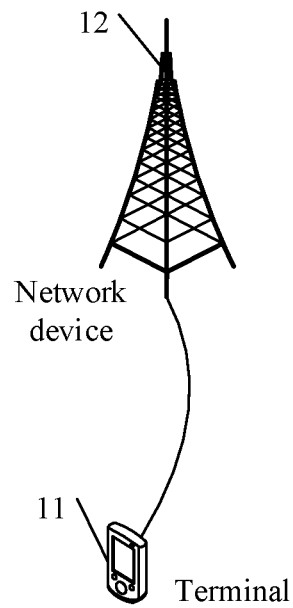
FIG. 1 is a structural diagram of a network system to which the embodiments of this application are applicable.

Referring to FIG. 1, FIG. 1 is a structural diagram of a network system to which the embodiments of this application are applicable. As shown in FIG. 1, the network system includes a terminal 11 and a network device 12. The terminal 11 may be a user terminal or another terminal-side device, for example, a mobile phone, a tablet personal computer, a laptop computer, a personal digital assistant (PDA), a mobile internet device (MID), or a wearable device. It should be noted that a specific type of the terminal 11 is not limited in this embodiment of the present application. The network device 12 may be a 5G base station, or a base station of a later version, or a base station in another communications system, or is referred to as a NodeB, or an evolved NodeB, or a transmission reception point (TRP), or an access point (AP), or other terms in the art. As long as a same technical effect is achieved, the network device is not limited to a specific technical term. In addition, the network device 12 may be a master node (MN) or a secondary node (SN). It should be noted that the 5G base station is used merely as an example in this embodiment of this application, rather than limiting a specific type of the network device.

For ease of understanding, the following describes some content included in the embodiments of this application.

In a massive MIMO system, pilot overheads and feedback overheads required for channel estimation and feedback are huge due to a huge quantity of antennas. In order to reduce pilot overheads and feedback overheads, channel estimation based on the compressed sensing (CS) theory can be implemented by making use of sparse characteristics of massive MIMO channels in spatial domain and angular domain. In this solution, it is concluded through analysis that channels of different antennas in spatial domain and angular domain have a structured sparsity characteristic due to limited scattering characteristics of the massive MIMO channels and close-arrangement characteristics of antenna arrays of a base station. Base on this characteristic, massive MIMO channel estimation is transformed into a coefficient signal recovery problem for structured compressed sensing. Specifically, the base station sends a small quantity of non-orthogonal pilots to reduce pilot overheads. The number of pilots is far less than the number of antennas. After receiving the pilot signal, a mobile user uses sparse signal recovery algorithms for compressed sensing, such as orthogonal matching pursuit (OMP), block Iterative support detection (Block ISD), approximate message passing (AMP), to resolve this problem. Both theoretical analysis and simulation results prove that in a case of obvious spatial sparsity, massive MIMO channel state information can be accurately obtained with low pilot overheads by using a channel estimation and feedback method based on structured compressed sensing.

Compressed sensing is considered as a promising method for reducing CSI overheads. However, such solutions have some inherent problems.

Problem 1: CS-based solutions greatly rely on sparsity assumption of spatial channels on some bases, whereas many real channels in practical scenarios do not actually have absolute sparsity on all basis vectors. Therefore, the CS-based channel feedback solution relies on a prior assumption of a perfectly sparse channel state information (CSI) matrix, and therefore has poor performance for massive MIMO channels satisfying only an approximately sparse condition. Consequently, the performance is difficult to meet requirements.

Problem 2: the CS-based methods use random mapping, and therefore cannot make good use of the inherent structural characteristics of the channels. That is, when the compressed sensing method is used for signal compression processing, a sensing matrix is randomly generated. The commonly used are a random Gaussian matrix and a random Bernoulli matrix. Apparently, statistical characteristics of signals are not considered in such matrices, and the matrices are not an optimal choice although it works. Finally, although a CS-based method can reduce pilot overheads, when the method itself has an estimation error, even in a case of a very high signal-to-noise ratio, it is still difficult to implement very high performance of channel estimation, and there is also a flat-bottom effect of the estimation error. Based on the foregoing status, it is difficult to apply compressed sensing to practical systems. Therefore, how to improve performance of compressive sensing-based channel estimation and make the compressive sensing-based channel estimation practical is a problem worth studying. In view of this, the solution of this application is proposed.

Figure 2:
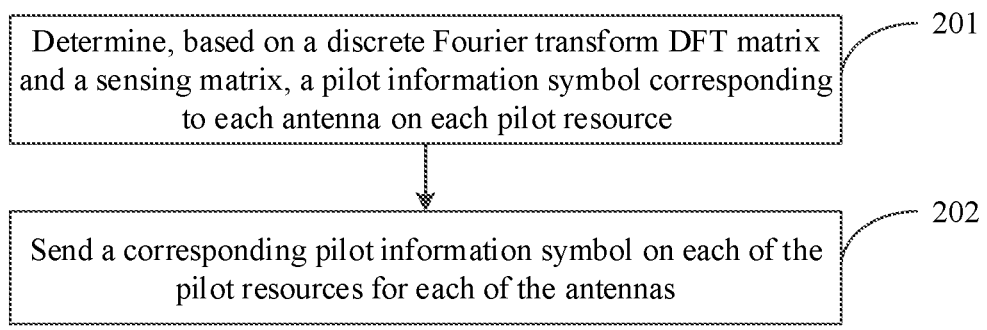
FIG. 2 is a flowchart of a pilot information symbol sending method according to an embodiment of this application.

Referring to FIG. 2, FIG. 2 is a flowchart of a pilot information symbol sending method according to an embodiment of this application. The method is applied to a transmit end, and as shown in FIG. 2, includes the following steps.

Step 201: Determine, based on a discrete Fourier transform DFT matrix and a sensing matrix, a pilot information symbol corresponding to each antenna on each pilot resource.

Step 202: Send a corresponding pilot information symbol on each of the pilot resources for each of the antennas.

The sensing matrix is determined through training of channel information.

In this application, uplink channel estimation or downlink channel estimation can be performed based on pilot information symbols. In other words, the transmit end may be a network device or a terminal. When the transmit end is a network device, downlink channel estimation can be performed based on the pilot information symbols; when the transmit end is a terminal, uplink channel estimation can be performed based on the pilot information symbols. In the following embodiments, downlink channel estimation is used as an example for description.

Specifically, the network device may include a plurality of antennas, and the number of the antennas is greater than the number of pilot resources. The number of pilot resources is at least two. Optionally, the number of pilot resources is far less than the number of antennas. For example, when the number of antennas is 64, the number of pilot resources may be 32. The network device needs to send a corresponding pilot information symbol on each of the pilot resources for each of the antennas. For example, for each of the 64 antennas, corresponding pilot information symbols need to be sent on the 32 pilot resources.

Optionally, in this embodiment, the determining, based on a discrete Fourier transform DFT matrix and a sensing matrix, a pilot information symbol corresponding to each antenna on each pilot resource includes:

determining, according to F*W=A, the pilot information symbol corresponding to each antenna on each pilot resource, where A is an observation matrix A formed by all pilot information symbols, W is a sensing matrix, F is an N-dimensional DFT matrix, and N is the number of the antennas.

It should be understood that, in this embodiment, the sensing matrix is a neural network obtained through deep learning and training in advance. If a pilot information symbol sent by the i-th transmit antenna on the j-th pilot resource is denoted by $a_{i,j}$, all $a_{i,j}$ can be combined into an observation matrix A, with a dimension being N*Np, where N is the number of antennas of the network device, and Np is the number of pilot resources. N elements of each column are transmitted on the N transmit antennas respectively. In this embodiment of this application, A=F*W, where W is the sensing matrix, and F is the N-dimensional DFT matrix. W can be obtained by using a deep learning method, and W can be understood as a layer of neural network that is determined through training of channel information. In this way, it can be ensured that the determined pilot information symbol is an optimal linear mapping adapted to a current channel. Optionally, deep learning and training may be performed in a case that a fixed channel estimation algorithm and a fixed AMP parameter of a receive end are determined, where the AMP parameter may be understood as a parameter corresponding to an AMP algorithm.

Figure 3:
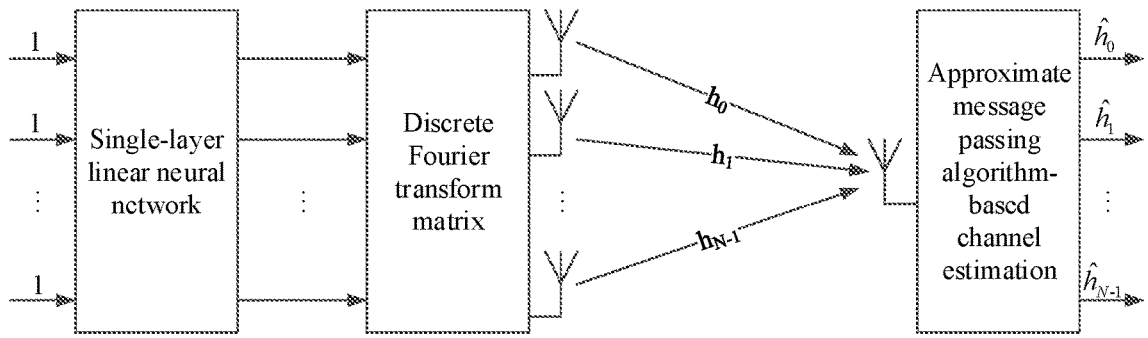
FIG. 3 is a learning principle diagram of a sensing network in a pilot information symbol sending method according to an embodiment of this application.

Optionally, in an embodiment, in order to find an optimal sensing matrix by using the neural network method, the sensing matrix is considered as a layer of linear neural network, which has no offset and activation functions as compared to a conventional neural network. During training, the sensing matrix of the transmit end, the AMP algorithm of the receive end, the massive MIMO channels, and introduced noise can be all considered as a neural network for training. As shown in FIG. 3, the receive end uses an original AMP algorithm, with its parameters being empirical values. Training data comes from different channels, and a goal of training optimization (cost function cost function) is to minimize a mean squared error between an output $[\hat{h}_0\ \hat{h}_1\ \ldots\ \hat{h}_{N-1}]$ on an output end of the AMP algorithm and actual channels $[\hat{h}_0\ \hat{h}_1\ \ldots\ \hat{h}_{N-1}]$, that is, $$\min\left(\sum_{i=0}^{N-1}|h_i-\hat{h}_i|^2\right).$$

In this embodiment of this application, the pilot information symbol corresponding to each antenna on each pilot resource is determined based on the DFT matrix and the sensing matrix; the corresponding pilot information symbol on each of the pilot resources is sent for each of the antennas, where the sensing matrix is determined through training of channel information. In this way, a small quantity of non-orthogonal pilots can be used for reduction of pilot overheads, so that the number of pilots is far less than the number of antennas, and the receive end can perform channel estimation based on the pilot information symbols, which resolves the problem of channel estimation in the massive MIMO communications network. In addition, because the pilot information symbol is determined by using the sensing matrix, it can be ensured that the determined pilot information symbol is an optimal linear mapping adapted to a current channel, thereby improving performance of channel estimation.

For example, in an embodiment, the method further includes:

training the sensing matrix, where the training the sensing matrix includes the following steps:

obtaining a plurality of groups of actual channel information that are obtained by performing channel estimation by the receive end based on a preset channel estimation algorithm and an approximate message passing AMP parameter; and performing iterative training on a preset neural network model based on the channel estimation algorithm, the AMP parameter, the plurality of groups of actual channel information, and the DFT matrix, so as to obtain the sensing matrix.

Optionally, the step of performing iterative training on a preset neural network model includes:

during the L-th iteration, adjusting variables of the neural network model based on channel estimation information obtained in the L-th iteration and the L-th group of channel information corresponding to the L-th iteration, where the channel estimation information is obtained by performing channel estimation on a target result based on the channel estimation algorithm and the AMP parameter, and the target result is a result of multiplying an output of the neural network model by the DFT matrix and then by the L-th group of channel information corresponding to the L-th iteration, where L is a positive integer.

The foregoing plurality of groups of actual channel information may be used as training data. In the 1st iteration process in the neural network model, a corresponding result output based on a preset variable value may be multiplied with the DFT matrix to obtain a product, the product is then multiplied with a group of actual channel information used in the 1st iteration process to obtain an intermediate result, and then channel estimation is performed using the intermediate result according to a pre-fixed channel estimation algorithm and an AMP parameter, so as to obtain channel estimation information of the 1st iteration. After the 1st iteration, variables of the neural network model may be adjusted through comparison between the channel estimation information and the group of actual channel information used in the 1st iteration, and the a next iteration is performed based on the adjusted variables until training of all training data is completed to obtain the sensing matrix. The variables described above may be understood as variables in the cost function.

In this embodiment of this application, the process of training the sensing matrix may be understood as one-stage deep learning. First-stage deep learning is intended to obtain optimal linear mapping adapted to the current channel in place of random mapping, and is corresponding to the compressed sensing algorithm, that is, an optimal sensing matrix for channel estimation is obtained.

It should be noted that each receive antenna at the receive end performs channel estimation independently, and therefore a case of channel estimation using only one receive antenna can be considered. Specifically, after receiving a pilot signal on each of the pilot resources, with the pilot signal including a pilot information symbol correspondingly sent by each antenna of the transmit end on the pilot resource, the receive end may perform channel estimation based on the learned approximate message passing LAMP network and the pilot information symbol.

In this embodiment, the pilot signal is sent by an antenna array and passes through a channel, and the signal is then received by a receive antenna on Np pilot resources. H=h*F to represent DFT transformation of the channel array. A signal finally observed by a baseband processing module is y, where y=h*A+n=h*F*W+n=H*W+n. In this case, an original signal H may be recovered from the known (y,W). A dimension of the original signal H is larger than a dimension of the observed signal y, and the original signal is sparse; therefore, the LAMP network can be used to recover the original signal, for channel estimation. The LAMP network is a neural network obtained by expanding an iterative solution process of the AMP algorithm. Through a training process of the deep neural network, its linear operating coefficients and nonlinear contraction parameters can be jointly optimized to obtain values of the distributed LAMP parameters. Training of these LAMP parameters is implemented after training of the sensing matrix W of the transmit end is completed, that is, the LAMP network is optimized based on the optimized W by using the channel information. In this embodiment of this application, channel estimation can be performed by using the LAMP network with optimized LAMP parameters, thereby improving performance of compressed sensing-based channel estimation and implementing high-performance massive MIMO channel estimation with low pilot overheads.

For example, in an embodiment, the training method of LAMP parameters includes the following steps:

obtaining a plurality of groups of actual channel information that are obtained by performing channel estimation by the receive end based on a preset channel estimation algorithm and an approximate message passing AMP parameter; and performing iterative training on a preset LAMP network based on an already-trained sensing matrix, the plurality of groups of actual channel information, and the DFT matrix, to obtain LAMP parameters.

Optionally, the step of performing iterative training on a preset LAMP network includes: during the L-th iteration, adjusting a LAMP parameter of the LAMP network based on channel estimation information obtained in the L-th iteration and the L-th group of channel information corresponding to the L-th iteration, where the channel estimation information is obtained by performing channel estimation based on the LAMP network, and the target result is a result of multiplying an output of the sensing matrix by the DFT matrix and then by the L-th group of channel information corresponding to the L-th iteration, where L is a positive integer.

It should be noted that the training process of the LAMP network (that is, the deep neural network) can be understood as second-stage deep learning. The second-stage deep learning is used to obtain optimal parameters (which are LAMP parameters) of the AMP algorithm after the optimal sensing matrix is obtained. In this way, performance of compressed sensing-based channel estimation is improved.

Further, pilot information symbols sent on different antennas are different, and pilot information symbols sent by a same antenna on different pilot resources are different. In other words, in this embodiment, the pilot information symbol sent on the j-th pilot resource for the i-th transmit antenna is unique.

Optionally, in an embodiment, the LAMP network is built based on a conventional compressed sensing algorithm, that is, based on AMP. The iterative solution process of the AMP algorithm is expanded into a neural network, to jointly optimize its linear operation coefficients and nonlinear contraction parameters. The values of these distribution parameters can be obtained through the training process of the deep neural network. During training of the LAMP network, the transmit end uses the already-trained and optimized sensing matrix. Optionally, a network structure of the LAMP network is shown in FIG. 4.

Figure 4:
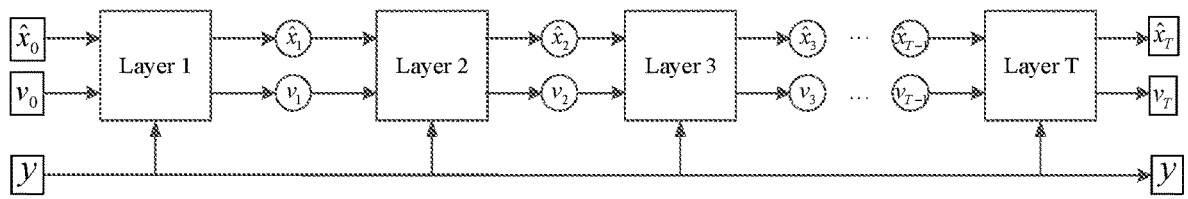
FIG. 4 is a structural diagram of a LAMP network in a pilot information symbol sending method according to an embodiment of this application.
Figure 5:
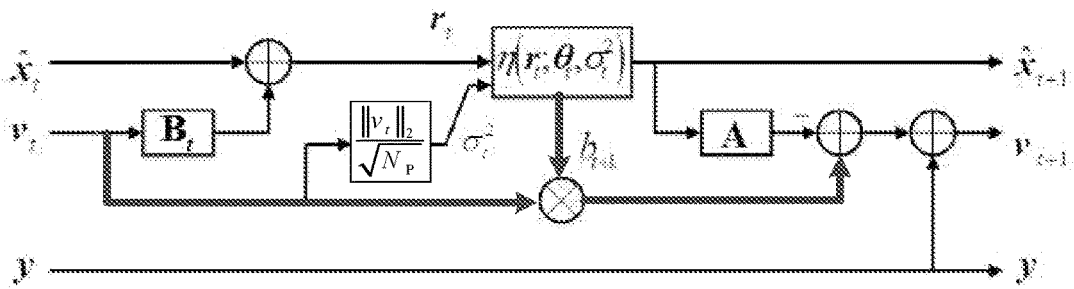
FIG. 5 is a structural diagram of the t-th layer of a LAMP network in a pilot information symbol sending method according to an embodiment of this application.

In FIG. 4, for a compressed sensing application scenario y=Ax+n, x sparse signals are estimated for recovery from known (y,A), where $\hat{x}$ indicates an estimated vector of the original sparse signal, y is an observation vector, and v is a residual vector. The observation vector y is used as a common input of all layers, and previous-layer outputs of the estimated vector $\hat{x}$ and the residual vector v are used as next-layer inputs of the estimated vector $\hat{x}$ and the residual vector v, respectively. The final estimate $\hat{x}_T$ of the original sparse signal is output after passing through the T-layer neural network. A network structure of the t-th layer is shown in FIG. 5. This structure corresponds exactly to the iterative process in the AMP algorithm, to implement updating of the estimated vector $\hat{x}$ and the residual vector v step by step. $B_t$ and $\eta(r_t;\theta t,\sigma_t^2)$ correspond to a linear weighting matrix and a nonlinear activation function in the neural network, respectively. $\eta(r_t;\theta_t,\sigma_t^2)=\max(|r_t|-\theta_t*\sigma_t^2, 0)$, where $r_t=x_t+B_tv_t$, $\theta_t$ represents a nonlinear parameter, and $\sigma_t^2$ a represents a noise parameter.

It should be noted that, branches corresponding to thick solid lines in the LAMP network structure used in this embodiment of this application correspond to Onsager correction items for accelerating convergence in the AMP algorithm. In addition, the nonlinear function in the LAMP algorithm is a contraction function derived from a specific signal estimation problem, rather than an activation function in the ordinary neural network, where the activation function has no clear physical meaning and is introduced just for providing a nonlinear function. Furthermore, the noise parameter $\sigma_t^2$ in the contraction function is related to the residual and can be updated layer by layer. Therefore, the LAMP network used in this embodiment of this application may be more suitable for the sparse signal recovery problem than the ordinary neural networks.

It should be understood that in this embodiment of this application, the LAMP algorithm combines deep learning with the AMP algorithm to take their advantages, not only using powerful learning abilities of the deep neural network but also retaining the functions of the AMP algorithm to implement sparse signal recovery.

In this embodiment of this application, a supervised learning mode can be used to perform network parameter training by inputting a data set $\{y_i,x_i\}_{i=1}^N$, where $y_i$ represents a low-dimensional observation signal, and $x_i$ represents a high-dimensional sparse signal. In order to further improve performance of the algorithm and make full use of the powerful learning abilities of the neural network, at each layer, the linear operator B may also be updated layer by layer (in the AMP algorithm, $B=A^T$), in addition to layer-by-layer updating of the nonlinear parameter $\theta_t$. Therefore, in the LAMP network, a parameter set that needs to be trained is $\Phi=\{B_t,\theta_t\}_{t=1}^T$.

Because the LAMP network is built on the basis of the AMP iterative algorithm, as inspired by iterative training during network training, the layer-by-layer training method is used to train the network to implement joint optimization of linear operation coefficients and nonlinear contraction parameters. Unlike the ordinary neural network that defines only one loss function, each layer in the LAMP network defines a loss function $L_t(\Phi)$ to implement layer-by-layer training, which is specifically defined as follows:

$$L_t(\Phi) = \frac{1}{N}\sum_{i=1}^{N}\|\hat{x}_t(y_i, \Phi) - x_i\|$$

It should be understood that in order to avoid network overfitting, the linear operation coefficient matrix $B_t$ and the nonlinear shrinkage parameter $\theta_t$ are trained at each layer first through separate optimization and then through joint optimization.

It should be noted that, in an embodiment, impact of a signal-to-noise ratio on channel estimation may be further considered. In other words, during training of the sensing matrix and the LAMP network, training may be performed within a specific signal-to-noise ratio range. The following describes in detail training of the sensing matrix and LAMP network.

In this embodiment, the sensing matrix W may be trained within a second signal-to-noise ratio range, that is, the sensing matrix W is applicable to the second signal-to-noise ratio range. The second signal-to-noise ratio range may be understood as a wide signal-to-noise ratio range. Because the network device does not know a signal-to-noise ratio of the receive end, training the sensing matrix W in the wide signal-to-noise ratio range can improve an applicable range of the sensing matrix W.

The training of the LAMP network may be performed in several different first signal-to-noise ratio ranges, to obtain LAMP parameters corresponding to different first signal-to-noise ratio ranges. For example, three groups of LAMP parameters may be obtained through training for a low SNR range (0-10 dB), a medium SNR range (10-20 dB), and a high SNR range (20-30 dB). In this way, the receive end can select corresponding LAMP parameters based on a current signal-to-noise ratio range to optimize the LAMP network for channel estimation.

Figure 6:
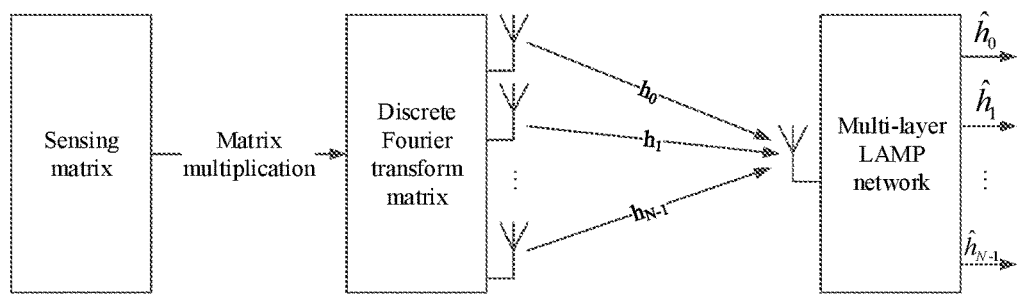
FIG. 6 is a block diagram of a massive MIMO channel estimation system in a pilot information symbol sending method according to an embodiment of this application.

It should be noted that, after training of the sensing matrix and the LAMP network is completed, the original signal H can be estimated by using the trained sensing matrix and LAMP network, so as to obtain an original multi-antenna channel h. The working process of pilot information symbol transmission and channel estimation of the entire system is as follows:

The network device uses each transmit antenna to transmit a pilot information symbol on each pilot resource based on the optimized sensing matrix and N-dimensional DFT matrix. For the terminal, the terminal first uses a receive antenna to receive a pilot signal on each pilot resource, and then based on these pilot signals, uses the LAMP network with optimized parameters to perform channel estimation, so as to implement high-performance massive MIMO channel estimation with low pilot overheads. An implementation architecture of the entire system is shown in FIG. 6.

Figure 7:
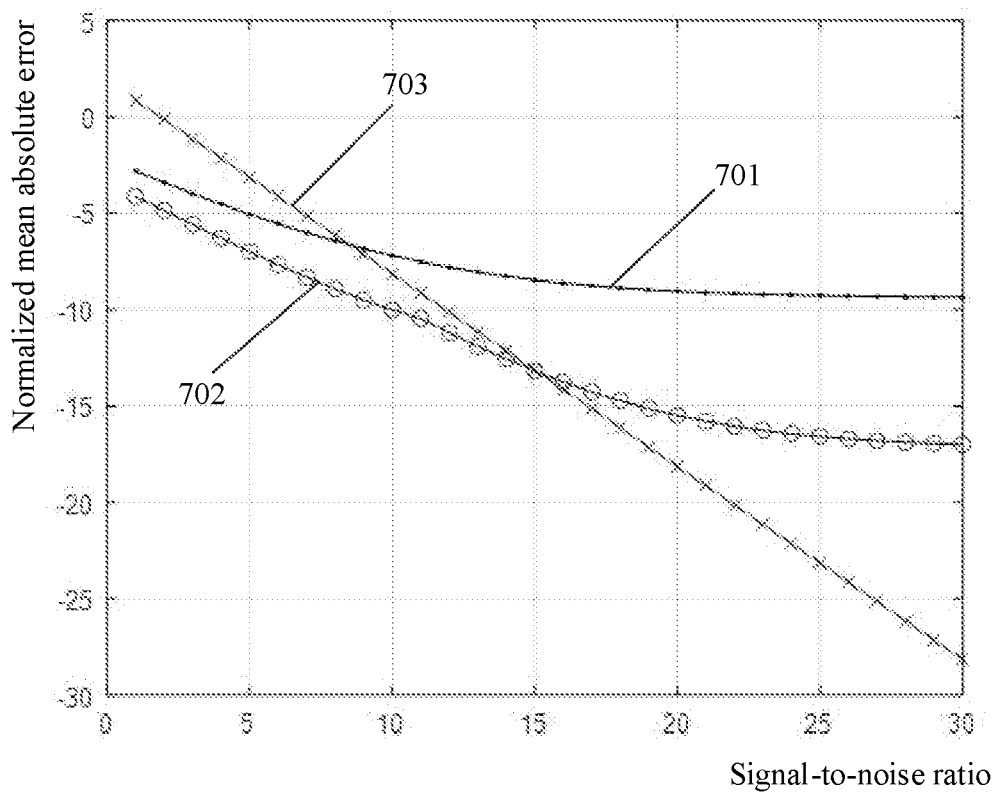
FIG. 7 is a channel estimation performance comparison diagram.

As shown in FIG. 7, in an embodiment, assuming 64-antenna MIMO uses only 32 pilot resources, 701 shows performance of channel estimation using a conventional APM method under different signal-to-noise ratios, 702 shows performance of channel estimation using the solution of this application under different signal-to-noise ratios, and 703 shows performance of channel estimation using an orthogonal pilot method under different signal-to-noise ratios. It can be learned from the figure that accuracy of channel estimation is significantly improved by using the solution of this application for channel estimation.

In this embodiment of this application, the pilot design and channel estimation based on two-stage deep learning can reduce the pilot overheads in comparison with the method for sending orthogonal pilots by using all antennas independently. As compared to pilot overheads for previous compressed sensing, optimal linear mapping for adapting to the current channel is obtained, and therefore performance is greatly improved under the condition of same pilot overheads. The two-stage deep learning method proposed in this application, the conventional compressed sensing AMP algorithm, and the orthogonal pilot method demonstrate different performance of channel estimation under different signal-to-noise ratios. It can be learned from the figure that accuracy of channel estimation is significantly improved by using the solution of this application. Therefore, the embodiments of this application improve performance of channel estimation.

Figure 8:
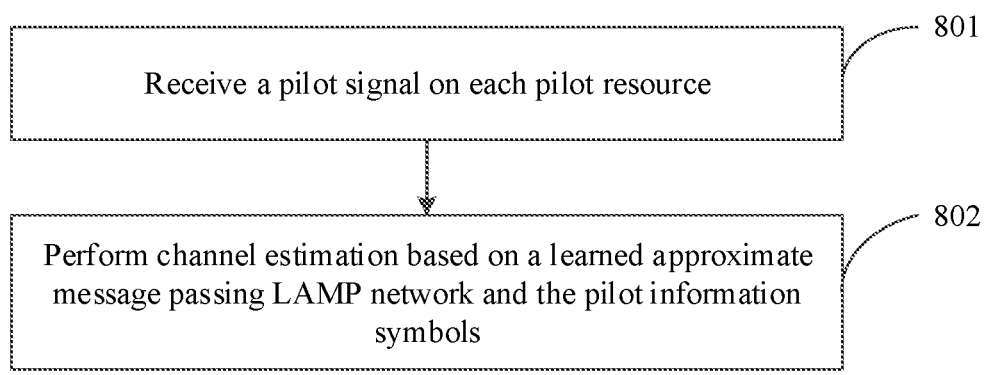
FIG. 8 is a flowchart of a channel estimation method according to an embodiment of this application.

Referring to FIG. 8, FIG. 8 is a flowchart of a channel estimation method according to an embodiment of this application. The method is applied to a receive end, and as shown in FIG. 8, includes the following steps.

Step 801: Receive a pilot signal on each pilot resource, where the pilot signal includes a pilot information symbol correspondingly sent on the pilot resource by each antenna of a transmit end.

Step 802: Perform channel estimation based on a learned approximate message passing LAMP network and the pilot information symbols.

The pilot information symbol is determined based on a discrete Fourier transform DFT matrix and a sensing matrix, the sensing matrix is determined through training of channel information, a LAMP parameter used for channel estimation by the LAMP network is obtained through training on a neural network that is expanded during an iterative solution process based on the sensing matrix and an AMP algorithm.

Optionally, the pilot information symbol is determined according to F*W=A, where A is an observation matrix A formed by all pilot information symbols, W is a sensing matrix, F is an N-dimensional DFT matrix, and N is the number of the antennas.

Optionally, the method further includes:

training the sensing matrix, where the training the sensing matrix includes the following steps:

obtaining a plurality of groups of actual channel information that are obtained by performing channel estimation by the receive end based on a preset channel estimation algorithm and an approximate message passing AMP parameter; and performing iterative training on a preset neural network model based on the channel estimation algorithm, the AMP parameter, the plurality of groups of actual channel information, and the DFT matrix, so as to obtain the sensing matrix.

Optionally, the step of performing iterative training on a preset neural network model includes:

during the L-th iteration, adjusting variables of the neural network model based on channel estimation information obtained in the L-th iteration and the L-th group of channel information corresponding to the L-th iteration, where the channel estimation information is obtained by performing channel estimation on a target result based on the channel estimation algorithm and the AMP parameter, and the target result is a result of multiplying an output of the neural network model by the DFT matrix and then by the L-th group of channel information corresponding to the L-th iteration, where L is a positive integer.

Optionally, before the performing channel estimation based on a learned approximate message passing LAMP network and the pilot information symbols, the method further includes:

determining a signal-to-noise ratio of the receive end; and determining a LAMP parameter corresponding to a target signal-to-noise ratio range as the LAMP parameter used for channel estimation by the LAMP network, where the target signal-to-noise ratio range is a first signal-to-noise ratio range corresponding to the signal-to-noise ratio in at least two first signal-to-noise ratio ranges.

Optionally, the first signal-to-noise ratio range is a signal-to-noise ratio range for obtaining the LAMP parameter through training, and the first signal-to-noise ratio range is in one-to-one correspondence to the LAMP parameter.

Optionally, the at least two first signal-to-noise ratio ranges are included in a second signal-to-noise ratio range, and the second signal-to-noise ratio range is a signal-to-noise ratio range for obtaining the sensing matrix through training on channel information.

Optionally, the number of antennas is greater than the number of pilot resources.

It should be noted that this embodiment is used as an implementation of the receive end corresponding to the embodiment shown in FIG. 2. For a specific implementation and a same beneficial effect achieved, refer to the related description of the embodiment shown in FIG. 2. Details are not described herein again.

Figure 9:
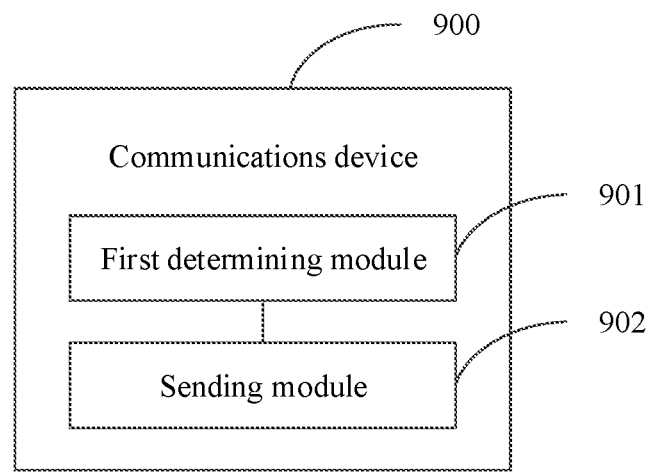
FIG. 9 is a structural diagram of a network device according to an embodiment of this application.

Referring to FIG. 9, FIG. 9 is a structural diagram of a communications device according to an embodiment of this application. The communications device is a transmit end of a pilot information symbol. As shown in FIG. 9, the transmit end 900 includes:

a first determining module 901, configured to determine, based on a discrete Fourier transform DFT matrix and a sensing matrix, a pilot information symbol corresponding to each antenna on each pilot resource; and a sending module 902, configured to send a corresponding pilot information symbol on each of the pilot resources for each of the antennas; where the sensing matrix is determined through training of channel information.

Optionally, the first determining module 901 is specifically configured to: determine, according to F*W=A, the pilot information symbol corresponding to each antenna on each pilot resource, where A is an observation matrix A formed by all pilot information symbols, W is the sensing matrix, F is an N-dimensional DFT matrix, and N is the number of the antennas.

Optionally, pilot information symbols sent on different antennas are different, and pilot information symbols sent by a same antenna on different pilot resources are different.

Optionally, the number of antennas is greater than the number of pilot resources.

The transmit end provided in this embodiment of this application is capable of implementing the processes implemented by the transmit end in the method embodiment in FIG. 2. To avoid repetition, details are not described herein again.

Figure 10:
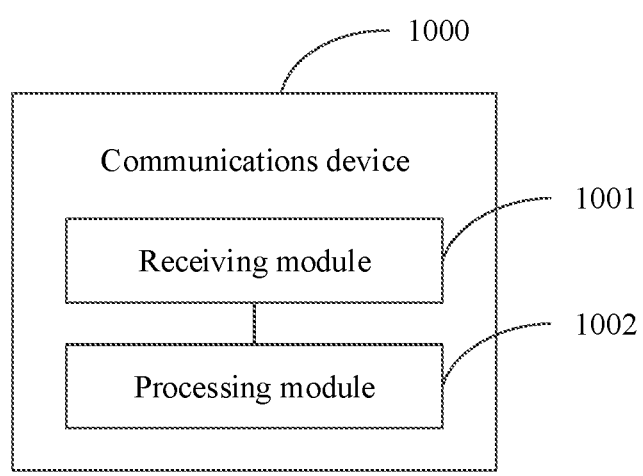
FIG. 10 is a structural diagram of a communications device according to an embodiment of this application.

Referring to FIG. 10, FIG. 10 is a structural diagram of a communications device according to an embodiment of this application. The communications device is a receive end of a pilot information symbol. As shown in FIG. 10, the receive end 1000 includes:

a receiving module 1001, configured to receive a pilot signal on each pilot resource, where the pilot signal includes a pilot information symbol correspondingly sent on the pilot resource by each antenna of a transmit end; and a processing module 1002, configured to perform channel estimation based on a learned approximate message passing LAMP network and the pilot information symbols; where the pilot information symbol is determined based on a discrete Fourier transform DFT matrix and a sensing matrix, the sensing matrix is determined through training of channel information, a LAMP parameter used for channel estimation by the LAMP network is obtained through training on a neural network that is expanded during an iterative solution process based on the sensing matrix and an AMP algorithm.

Optionally, the pilot information symbol is determined according to F*W=A, where A is an observation matrix A formed by all pilot information symbols, W is a sensing matrix, F is an N-dimensional DFT matrix, and N is the number of the antennas.

Optionally, pilot information symbols sent on different antennas are different, and pilot information symbols sent by a same antenna on different pilot resources are different.

Optionally, the communications device further includes:

a second determining module, configured to determine a signal-to-noise ratio of the receive end; and a third determining module, configured to determine a LAMP parameter corresponding to a target signal-to-noise ratio range as the LAMP parameter used for channel estimation by the LAMP network, where the target signal-to-noise ratio range is a first signal-to-noise ratio range corresponding to the signal-to-noise ratio in at least two first signal-to-noise ratio ranges.

Optionally, the first signal-to-noise ratio range is a signal-to-noise ratio range for obtaining the LAMP parameter through training, and the first signal-to-noise ratio range is in one-to-one correspondence to the LAMP parameter.

Optionally, the at least two first signal-to-noise ratio ranges are included in a second signal-to-noise ratio range, and the second signal-to-noise ratio range is a signal-to-noise ratio range for obtaining the sensing matrix through training on channel information.

Optionally, the number of antennas is greater than the number of pilot resources.

The communications device provided in this embodiment of this application is capable of implementing the processes implemented by the communications device in the method embodiment in FIG. 8. To avoid repetition, details are not described herein again.

Figure 11:
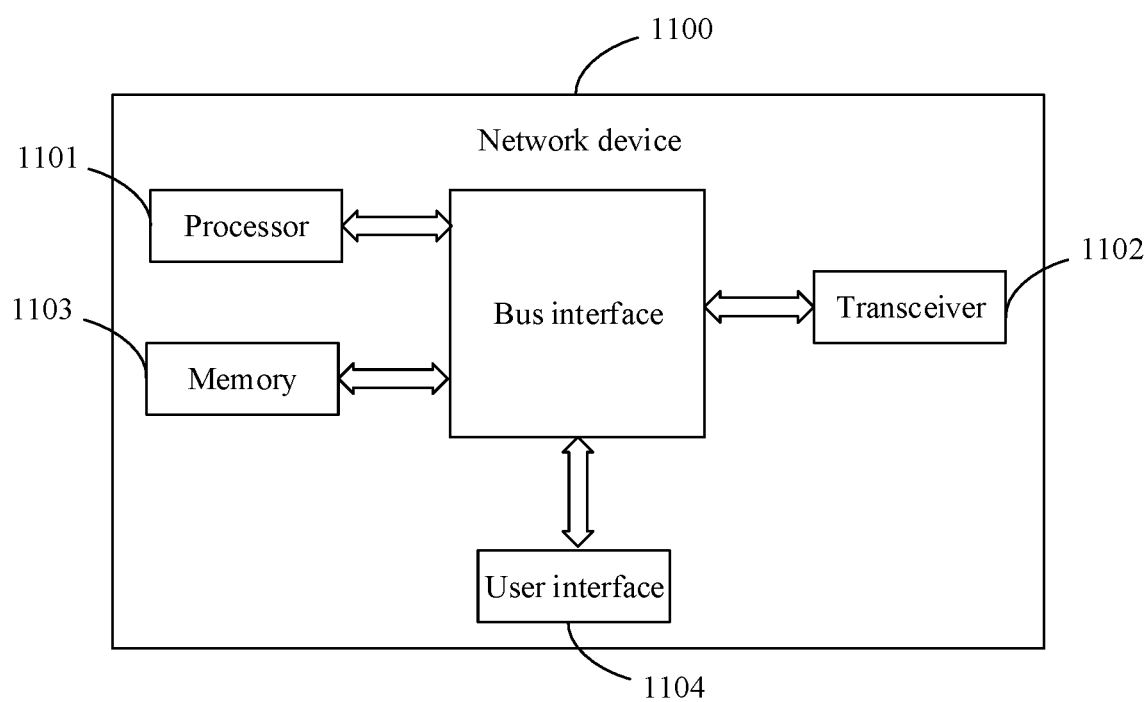
FIG. 11 is a structural diagram of another network device according to an embodiment of this application.

Referring to FIG. 11, FIG. 11 is a structural diagram of another network device according to an embodiment of this application. As shown in FIG. 11, the network device 1100 includes a processor 1101, a transceiver 1102, a memory 1103, and a bus interface.

The processor 1101 is configured to determine, based on a discrete Fourier transform DFT matrix and a sensing matrix, a pilot information symbol corresponding to each antenna on each pilot resource.

The transceiver 1102 is configured to send a corresponding pilot information symbol on each of the pilot resources for each of the antennas.

The sensing matrix is determined through training of channel information.

It should be understood that in this embodiment, the processor 1101 and the transceiver 1102 is capable of implementing the processes implemented by the network device in the method embodiment in FIG. 2. To avoid repetition, details are not described herein again.

In FIG. 11, a bus architecture may include any quantity of interconnected buses and bridges, specifically for interconnecting various circuits of one or more processors represented by the processor 1101 and a memory represented by the memory 1103. The bus architecture may further interconnect various other circuits such as a peripheral device, a voltage regulator, and a power management circuit. These are all well known in the art, and therefore are not further described in this specification. The bus interface provides an interface. The transceiver 1102 may be a plurality of components, that is, the transceiver 1102 includes a transmit end and a receiver, and provides a unit for communicating with various other apparatuses on a transmission medium. For different user equipments, the user interface 1104 may also be an interface for externally or internally connecting a required device, and the connected device includes but is not limited to a mini keyboard, a display, a speaker, a microphone, a joystick, or the like.

The processor 1101 is responsible for management of the bus architecture and general processing, and the memory 1103 is capable of storing data that is used by the processor 1101 during operation.

Preferably, an embodiment of this application further provides a network device, including a processor 1101, a memory 1103, and a program or an instruction stored in the memory 1103 and capable of running on the processor 1101. When the program or the instruction is executed by the processor 1101, the processes of the foregoing embodiment of the pilot information symbol sending method are implemented, with the same technical effects achieved. To avoid repetition, details are not described herein again.

Figure 12:
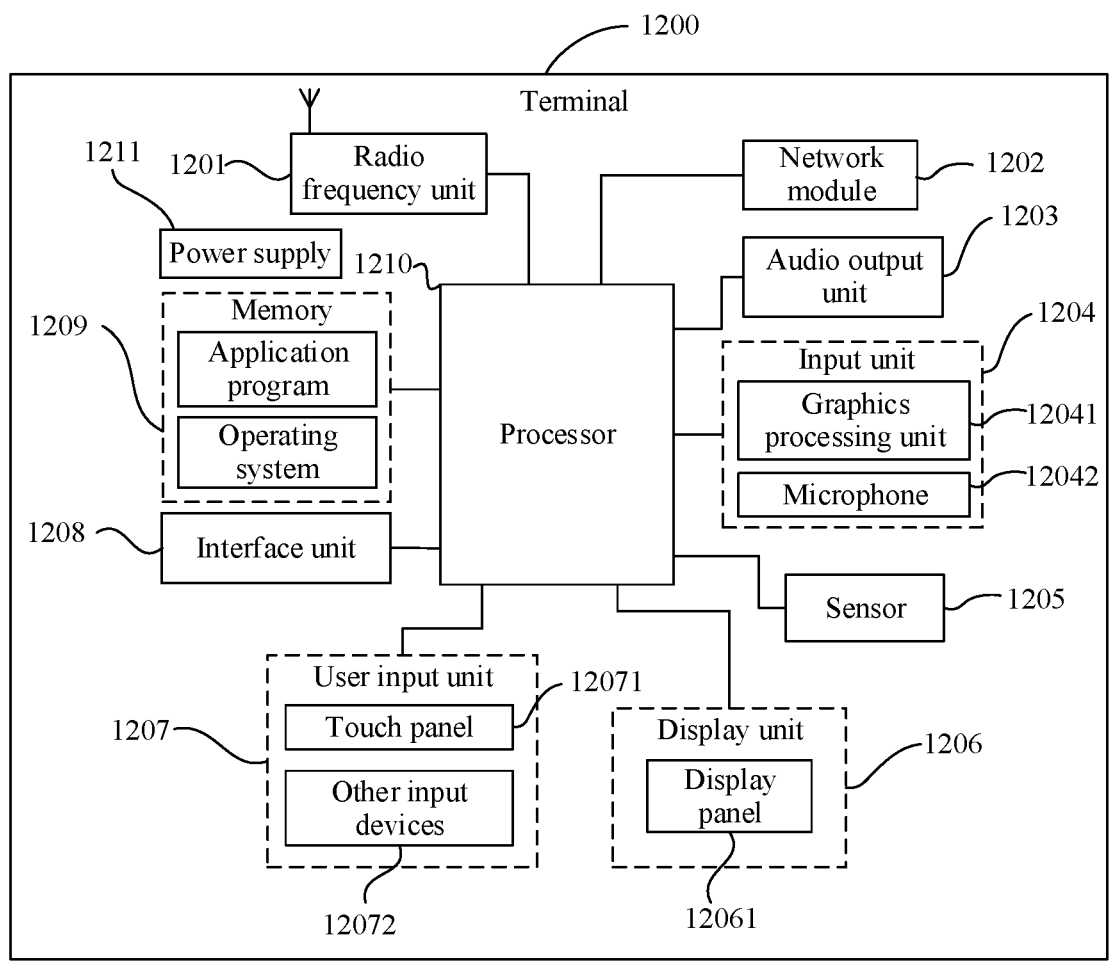
FIG. 12 is a structural diagram of another terminal according to an embodiment of this application.

FIG. 12 is a schematic diagram of a hardware structure of a terminal for implementing the embodiments of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the terminal shown in FIG. 12 does not constitute any limitation on the terminal. The terminal may include more or fewer components than those shown in the figure, or a combination of some components, or the components disposed differently.

The radio frequency unit 1201 is configured to receive a pilot signal on each pilot resource, where the pilot signal includes a pilot information symbol correspondingly sent on the pilot resource by each antenna of a transmit end.

The processor 1210 is configured to perform channel estimation based on a learned approximate message passing LAMP network and the pilot information symbols.

The pilot information symbol is determined based on a discrete Fourier transform DFT matrix and a sensing matrix, the sensing matrix is determined through training of channel information, a LAMP parameter used for channel estimation by the LAMP network is obtained through training on a neural network that is expanded during an iterative solution process based on the sensing matrix and an AMP algorithm.

It should be understood that in the embodiments of this application, the processor 1210 and the radio frequency unit 1201 are capable of implementing the processes implemented by the communications device in the method embodiment in FIG. 8. To avoid repetition, details are not described herein again.

It should be understood that in this embodiment of this application, the radio frequency unit 1201 may be configured to receive and send information, or to receive and send a signal in a call process, and specially, after receiving downlink data from a base station, send the downlink data to the processor 1210 for processing; and also send uplink data to the base station. Generally, the radio frequency unit 1201 includes but is not limited to an antenna, at least one amplifier, a transceiver, a coupler, a low noise amplifier, a duplexer, and the like. In addition, the radio frequency unit 1201 may also communicate with a network and other devices via a wireless communications system.

The terminal provides a user with wireless broadband internet access through the network module 1202, for example, helping the user to transmit and receive e-mails, browse web pages, and access streaming media.

The audio output unit 1203 may convert audio data received by the radio frequency unit 1201 or the network module 1202 or stored in the memory 1209 into an audio signal and output the audio signal as a sound. In addition, the audio output unit 1203 may further provide an audio output (for example, a call signal received sound or a message received sound) related to a specific function performed by the terminal 1200. The audio output unit 1203 includes a speaker, a buzzer, a receiver, and the like.

The input unit 1204 is configured to receive an audio or video signal. The input unit 1204 may include a graphics processing unit (GPU) 12041 and a microphone 12042. The graphics processing unit 12041 processes image data of a still picture or a video obtained by an image capture apparatus (for example, a camera) in an image capture mode or a video capture mode. A processed image frame may be displayed on the display unit 1206. The image frame processed by the graphics processing unit 12041 may be stored in the memory 1209 (or another storage medium) or be transmitted by the radio frequency unit 1201 or the network module 1202. The microphone 12042 is capable of receiving sounds and processing such sounds into audio data. The processed audio data may be converted in a telephone call mode into a format that can be transmitted by the radio frequency unit 1201 to a mobile communications base station, for outputting.

The terminal 1200 may further include at least one sensor 1205, for example, an optical sensor, a motion sensor, and another sensor. Specifically, the optical sensor includes an ambient light sensor and a proximity sensor. The ambient light sensor may adjust luminance of a display panel 12061 based on brightness of ambient light. The proximity sensor may turn off the display panel 12061 and/or backlight when the terminal 1200 moves to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 1205 may also include a fingerprint sensor, a pressure sensor, an iris sensor, a molecular sensor, a gyroscope, a barometer, a hygrometer, a thermometer, an infrared sensor, and the like. Details are not described herein.

The display unit 1206 is configured to display information input by the user or information provided to the user. The display unit 1206 may include a display panel 12061, and the display panel 12061 may be configured in a form of a liquid crystal display (LCD), an organic light-emitting diode (OLED), or the like.

The user input unit 1207 may be configured to: receive a digit or character information that is input, and generate signal input related to user settings and function control of the terminal. Specifically, the user input unit 1207 may include a touch panel 12071 and other input devices 12072. The touch panel 12071 is also referred to as a touchscreen and can collect a touch operation (such as an operation performed by the user on the touch panel 12071 or near the touch panel 12071 with a finger or by using any proper object or accessory such as a stylus) of the user on or near the touch panel 12071. The touch panel 12071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1210, and can receive a command transmitted by the processor 1210 and execute the command. In addition, the touch panel 12071 may be implemented in a plurality of forms, for example, a resistive, capacitive, infrared, or surface acoustic wave touch panel. The user input unit 1207 may further include the other input devices 12072 in addition to the touch panel 12071. Specifically, the other input devices 12072 may include but are not limited to a physical keyboard, a function key (such as a volume control key or a switch key), a trackball, a mouse, and a joystick. Details are not described herein.

Further, the touch panel 12071 may cover the display panel 12061. When detecting a touch operation on or near the touch panel 12071, the touch panel 12071 transmits the touch operation to the processor 1210 to determine a type of a touch event. Then, the processor 1210 provides a corresponding visual output on the display panel 12061 based on the type of the touch event. In FIG. 12, the touch panel 12071 and the display panel 12061 serve as two independent components to implement input and output functions of the terminal. In some embodiments, however, the touch panel 12071 may be integrated with the display panel 12061 to implement the input and output functions of the terminal. This is not specifically limited herein.

The interface unit 1208 is an interface between an external apparatus and the terminal 1200. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1208 may be configured to receive an input (for example, data information or power) from an external apparatus, and transmit the received input to one or more components in the terminal 1200, or may be configured to transmit data between the terminal 1200 and an external apparatus.

The memory 1209 may be configured to store software programs and various data. The memory 1209 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 1209 may include a high-speed random access memory, and may further include a non-volatile memory such as a disk storage device, a flash memory device, or another volatile solid-state storage device.

The processor 1210 is a control center of the terminal, and is connected to all components of the terminal by using various interfaces and lines. By running or executing a software program and/or module that is stored in the memory 1209 and calling data stored in the memory 1209, the processor 1210 executes various functions of the terminal and processes data, so as to perform overall monitoring on the terminal. The processor 1210 may include one or more processing units. Preferably, an application processor and a modem processor may be integrated in the processor 1210. The application processor primarily processes an operating system, user interfaces, application programs, and the like. The modem processor primarily processes radio communication. It can be understood that the modem processor may alternatively be not integrated in the processor 1210.

The terminal 1200 may further include the power supply 1211 (such as a battery) supplying power to each component. Preferably, the power supply 1211 may be logically connected to the processor 1210 by using a power management system, so that functions such as charge and discharge management and power consumption management are implemented by using the power management system.

In addition, the terminal 1200 includes some functional modules that are not illustrated. Details are not described herein.

Preferably, an embodiment of this application further provides a terminal, including a processor 1210, a memory 1209, and a program or an instruction stored in the memory 1209 and capable of running on the processor 1210. When the program or the instruction is executed by the processor 1210, the processes of the foregoing channel estimation method estimations are implemented, with the same technical effects achieved. To avoid repetition, details are not described herein again.

An embodiment of this application further provides a readable storage medium, where a program or an instruction is stored in the readable storage medium. When the program or the instruction is executed by a processor, the processes of the foregoing embodiments of the pilot information symbol sending method provided in the embodiments of this application can be implemented, or when the program or the instruction is executed by a processor, the processes of the foregoing embodiments of the channel estimation method provided in the embodiments of this application can be implemented, with the same technical effects achieved. To avoid repetition, details are not described herein again.

The processor is a processor in the electronic device described in the foregoing embodiments. The readable storage medium includes a computer-readable storage medium, for example, a read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction to implement the processes of the foregoing embodiments of the pilot information symbol sending method or the channel estimation method, with the same technical effects achieved. To avoid repetition, details are not described herein again.

It should be understood that the chip mentioned in the embodiments of this application may also be referred to as a system-level chip, a system chip, a chip system, a system-on-chip, or the like. It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A pilot information symbol sending method, applied to a transmit end and comprising:
   determining, based on a discrete Fourier transform (DFT) matrix and a sensing matrix, a pilot information symbol corresponding to each antenna on each pilot resource; and
   sending a corresponding pilot information symbol on each of the pilot resources for each of the antennas; wherein the sensing matrix is determined through training of channel information.

2. The method according to claim 1, wherein the determining, based on a discrete Fourier transform (DFT) matrix and a sensing matrix, a pilot information symbol corresponding to each antenna on each pilot resource comprises:
   determining, according to F*W=A, the pilot information symbol corresponding to each antenna on each pilot resource, wherein A is an observation matrix A formed by all pilot information symbols, W is the sensing matrix, F is an N-dimensional DFT matrix, and N is the number of the antennas.

3. The method according to claim 1, further comprising:
   training the sensing matrix, wherein the training the sensing matrix comprises the following steps:
   obtaining a plurality of groups of actual channel information that are obtained by performing channel estimation by a receive end based on a preset channel estimation algorithm and an approximate message passing (AMP) parameter; and
   performing iterative training on a preset neural network model based on the channel estimation algorithm, the AMP parameter, the plurality of groups of actual channel information, and the DFT matrix, so as to obtain the sensing matrix.

4. The method according to claim 3, wherein the step of performing iterative training on a preset neural network model comprises:
   during the L-th iteration, adjusting variables of the neural network model based on channel estimation information obtained in the L-th iteration and the L-th group of channel information corresponding to the L-th iteration, wherein the channel estimation information is obtained by performing channel estimation on a target result based on the channel estimation algorithm and the AMP parameter, and the target result is a result of multiplying an output of the neural network model by the DFT matrix and then by the L-th group of channel information corresponding to the L-th iteration, wherein L is a positive integer.

5. The method according to claim 1, wherein pilot information symbols sent on different antennas are different, and pilot information symbols sent by a same antenna on different pilot resources are different.

6. The method according to claim 1, wherein the number of antennas is greater than the number of pilot resources.

7. A non-transitory computer-readable storage medium, wherein the readable storage medium stores a program or an instruction, and the program or the instruction, when being executed by a processor, causes the processor to implement the steps of the pilot information symbol sending method according to claim 1.

8. A channel estimation method, applied to a receive end and comprising:
   receiving a pilot signal on each pilot resource, wherein the pilot signal comprises a pilot information symbol correspondingly sent on the pilot resource by each antenna of a transmit end; and
   performing channel estimation based on a learned approximate message passing (LAMP) network and the pilot information symbols; wherein
   the pilot information symbol is determined based on a discrete Fourier transform (DFT) matrix and a sensing matrix, the sensing matrix is determined through training of channel information, a LAMP parameter used for channel estimation by the LAMP network is obtained through training on a neural network that is expanded during an iterative solution process based on the sensing matrix and an AMP algorithm.

9. The method according to claim 8, wherein the pilot information symbol is determined according to F*W=A, wherein A is an observation matrix A formed by all pilot information symbols, W is a sensing matrix, F is an N-dimensional DFT matrix, and N is the number of the antennas.

10. The method according to claim 8, further comprising:
    training the sensing matrix, wherein the training the sensing matrix comprises the following steps:
    obtaining a plurality of groups of actual channel information that are obtained by performing channel estimation by the receive end based on a preset channel estimation algorithm and an approximate message passing (AMP) parameter; and
    performing iterative training on a preset neural network model based on the channel estimation algorithm, the AMP parameter, the plurality of groups of actual channel information, and the DFT matrix, so as to obtain the sensing matrix.

11. The method according to claim 10, wherein the step of performing iterative training on a preset neural network model comprises:
    during the L-th iteration, adjusting variables of the neural network model based on channel estimation information obtained in the L-th iteration and the L-th group of channel information corresponding to the L-th iteration, wherein the channel estimation information is obtained by performing channel estimation on a target result based on the channel estimation algorithm and the AMP parameter, and the target result is a result of multiplying an output of the neural network model by the DFT matrix and then by the L-th group of channel information corresponding to the L-th iteration, wherein L is a positive integer.

12. The method according to claim 8, wherein pilot information symbols sent on different antennas are different, and pilot information symbols sent by a same antenna on different pilot resources are different.

13. The method according to claim 8, wherein before the performing channel estimation based on a learned approximate message passing LAMP network and the pilot information symbols, the method further comprises:
    determining a signal-to-noise ratio of the receive end; and
    determining a LAMP parameter corresponding to a target signal-to-noise ratio range as the LAMP parameter used for channel estimation by the LAMP network, wherein the target signal-to-noise ratio range is a first signal-to-noise ratio range corresponding to the signal-to-noise ratio in at least two first signal-to-noise ratio ranges.

14. The method according to claim 13, wherein the first signal-to-noise ratio range is a signal-to-noise ratio range for obtaining the LAMP parameter through training, and the first signal-to-noise ratio range is in one-to-one correspondence to the LAMP parameter.

15. The method according to claim 14, wherein the at least two first signal-to-noise ratio ranges are comprised in a second signal-to-noise ratio range, and the second signal-to-noise ratio range is a signal-to-noise ratio range for obtaining the sensing matrix through training on channel information.

16. The method according to claim 8, wherein the number of antennas is greater than the number of pilot resources.

17. A communications device, wherein the communications device is a receive end of a pilot information symbol and comprises: a memory, a processor, and a program or an instruction stored in the memory and capable of running on the processor, wherein when executed the program or the instruction, the processor is configured to implement the steps of the channel estimation method according to claim 8.

18. A communications device, wherein the communications device is a transmit end of a pilot information symbol and comprises: a memory, a processor, and a program or an instruction stored in the memory and capable of running on the processor, wherein when executed the program or the instruction, the processor is configured to:
    determine, based on a discrete Fourier transform DFT matrix and a sensing matrix, a pilot information symbol corresponding to each antenna on each pilot resource; and
    send a corresponding pilot information symbol on each of the pilot resources for each of the antennas; wherein
    the sensing matrix is determined through training of channel information.

19. The communications device according to claim 18, wherein the processor is specifically configured to: determine, according to F*W=A, the pilot information symbol corresponding to each antenna on each pilot resource, wherein A is an observation matrix A formed by all pilot information symbols, W is the sensing matrix, F is an N-dimensional DFT matrix, and N is the number of the antennas.

20. The communications device according to claim 18, wherein pilot information symbols sent on different antennas are different, and pilot information symbols sent by a same antenna on different pilot resources are different.

* * * * *